United States Patent
Takeda et al.

(10) Patent No.: US 11,554,492 B2
(45) Date of Patent: Jan. 17, 2023

(54) WORKPIECE CONVEYING SYSTEM, CONVEYED WORKPIECE NUMBER DETECTOR, AND CONTROL METHOD FOR THE WORKPIECE CONVEYING SYSTEM

(71) Applicant: AIDA ENGINEERING, LTD., Kanagawa (JP)

(72) Inventors: Keisuke Takeda, Kanagawa (JP); Satoshi Suzuki, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 498 days.

(21) Appl. No.: 16/738,860

(22) Filed: Jan. 9, 2020

(65) Prior Publication Data
US 2020/0238528 A1    Jul. 30, 2020

(30) Foreign Application Priority Data

Jan. 24, 2019  (JP) .............................. JP2019-010167

(51) Int. Cl.
*B25J 9/16* (2006.01)
*B21D 43/02* (2006.01)
(Continued)

(52) U.S. Cl.
CPC .......... *B25J 9/1694* (2013.01); *B21D 43/021* (2013.01); *B25J 15/008* (2013.01); *B65G 59/04* (2013.01)

(58) Field of Classification Search
CPC ...... B21D 43/24; B21D 43/18; B21D 43/021; B65H 3/0816; B65H 7/12;
(Continued)

(56) References Cited

U.S. PATENT DOCUMENTS 4,352,627 A * 10/1982 Schneider .............. B21D 43/24
414/797
4,804,173 A    2/1989 Pol et al.
(Continued)

FOREIGN PATENT DOCUMENTS

EP          2177326 A2    4/2010
JP       S62-173335 U    11/1987
(Continued)

OTHER PUBLICATIONS

Japanese Office Action issued in corresponding Japanese Patent Application No. 2019-010167, dated May 6, 2021, with English translation.
(Continued)

*Primary Examiner* — Gregory W Adams
(74) *Attorney, Agent, or Firm* — McDermott Will & Emery LLP

(57) ABSTRACT

Provided is a workpiece conveying system configured to convey a sheet-like workpiece to a downstream step, including: a workpiece conveyor configured to lift through attraction holding, by a workpiece holding unit, an uppermost workpiece W of a stack, and convey the uppermost workpiece W of the stack to the downstream step one by one; and a conveyed workpiece number detector configured to detect the number of workpieces W held by the workpiece holding unit at a detection timing, at which the workpiece W held and raised by the workpiece holding unit in accordance with a normal workpiece conveying operation performed by the workpiece conveyor reaches an upper limit position of raising the workpiece W, and at which a moving speed component of the workpiece W in a raising direction is 0.

13 Claims, 10 Drawing Sheets

(51) Int. Cl.
  *B25J 15/00*    (2006.01)
  *B65G 59/04*    (2006.01)

(58) Field of Classification Search
  CPC .. B65H 2511/524; B65G 59/04; B65G 61/00; B65G 59/02; B25J 9/1694; B25J 15/008
  See application file for complete search history.

(56) References Cited

U.S. PATENT DOCUMENTS

| | | | | |
|---|---|---|---|---|
| 4,905,982 A | * | 3/1990 | Baba | B65H 3/0816 |
| | | | | 271/262 |
| 4,971,515 A | * | 11/1990 | Pol | B65H 7/16 |
| | | | | 271/262 |
| 5,848,785 A | * | 12/1998 | Hardwick | B65H 3/46 |
| | | | | 271/93 |
| 5,899,341 A | * | 5/1999 | Irita | B65H 3/0816 |
| | | | | 414/789.5 |
| 6,652,217 B2 | * | 11/2003 | Dettman | B65G 59/04 |
| | | | | 271/93 |
| 8,424,359 B2 | | 4/2013 | Theis et al. | |
| 8,961,094 B2 | * | 2/2015 | Ruth | B65G 47/22 |
| | | | | 414/754 |
| 2002/0195765 A1 | * | 12/2002 | Tunink | B65H 3/48 |
| | | | | 271/9.01 |
| 2008/0277860 A1 | * | 11/2008 | Chen | B65H 7/12 |
| | | | | 271/3.17 |
| 2018/0002118 A1 | * | 1/2018 | Semmelrock | B65H 7/14 |

FOREIGN PATENT DOCUMENTS

| | | | |
|---|---|---|---|
| JP | H08192236 A | | 7/1996 |
| JP | 11244965 A | * | 9/1999 |
| JP | 2008-93698 A | | 4/2008 |
| JP | 2014-155965 A | | 8/2014 |
| JP | 2014-172047 A | | 9/2014 |

OTHER PUBLICATIONS

Extended European Search Report issued in correponding European Patent Application No. 20152686.0, dated May 17, 2021.
Decision of Refusal issued in corresponding Japanese Patent Application No. 2019-010167, dated Sep. 28, 2021, with English translation.
Extended Euopean Search Report issued in corresponding European Patent Application No. 20152686.0, dated May 26, 2020.

* cited by examiner

WORKPIECE CONVEYING SYSTEM, CONVEYED WORKPIECE NUMBER DETECTOR, AND CONTROL METHOD FOR THE WORKPIECE CONVEYING SYSTEM

BACKGROUND OF THE INVENTION

1. Field of the Invention

The present invention relates to a technology of improving a workpiece conveying system configured to successively take a sheet-like member from a top of a stack (bunch) stacking a plurality of sheet-like workpieces one by one, and to convey the sheet-like member to, for example, a pressing machine in a next step (downstream step).

2. Description of the Related Art

Hitherto, as a technology of feeding a sheet-like workpiece (thin-plate-like workpiece) of this kind to the pressing machine, for example, in Japanese Patent Application Laid-open No. 2014-172047, a workpiece conveying system as illustrated in FIG. 9 is described. The workpiece conveying system refers to a system configured to take a workpiece from a top of a bunch-like sheet group (bunch (stack) stacking a plurality of sheet-like workpieces) one by one, and convey (feed) the workpiece to a next step (for example, to the pressing machine).

Incidentally, when the sheet-like workpieces W are stacked, the upper and lower workpieces W closely attract (or adhere) to each other due to, for example, an oil attracting (or adhering) to surfaces of the workpieces W. Thus, when an uppermost workpiece W is intended to be lifted and conveyed, in some cases, a workpiece W directly below the uppermost workpiece W is also lifted together. This is what is called a state in which two workpieces (or double workpieces) are taken. When the workpieces W are set to, for example, the pressing machine in the next step under the state in which the two workpieces are taken, various troubles are caused. Accordingly, it has been required to detect taking of two workpieces before conveying the workpieces to the next step, to thereby prevent the workpieces from being conveyed to the next step under the state in which the two workpieces are taken.

In this context, in a workpiece conveying system 1 as illustrated in FIG. 9 and described in Japanese Patent Application Laid-open No. 2014-172047, when the uppermost workpiece W among workpieces W stacked in a bunch-like (stack-like) shape is lifted one by one by a workpiece holding unit 7 of a workpiece conveying device 9 formed of an articulated arm robot, before the workpiece W is conveyed to the next step (downstream step), a workpiece receiving member 13 is moved between the lifted workpiece W and the stack of the remaining workpieces W, and a two-workpiece (or double workpieces) taking detection unit 17 of the workpiece receiving member 13 detects whether or not two workpieces (or double workpieces) are taken.

When the detection result is that one workpiece W is taken (the detection result is normal), the workpiece W is conveyed subsequently by the workpiece conveying device 9 to the next step.

Meanwhile, the workpiece conveying system 1 described in Japanese Patent Application Laid-open No. 2014-172047 is configured so that, when the detection result is that two workpieces W are taken (the detection result is abnormal), the workpieces W (two taken workpieces W) held by the workpiece holding unit 7 are placed on a material table 19 after the workpiece receiving member 13 and the workpieces W (and the workpiece holding unit 7) are moved to a position above the material table 19, and then the workpiece receiving member 13 is retreated from the position above the material table 19.

With reference to the content described in Japanese Patent Application Laid-open No. 2014-172047, the two-workpiece taking detection unit 17, as described in Japanese Patent Application Laid-open No. 2014-172047, detects a thickness of the workpiece(s) W held by the workpiece holding unit 7, and detects, based on the detection result, whether the number of workpieces W held by the workpiece holding unit 7 is one or two (see FIG. 10).

However, such a method of detecting taking of two workpieces in the workpiece conveying system 1, as described in Japanese Patent Application Laid-open No. 2014-172047, requires a process (step) of stopping a workpiece conveying operation during workpiece conveyance in order to detect taking of two workpieces, which is different from the normal workpiece conveying operation. Under a circumstance in which high-speed conveyance of the workpiece is demanded, it is actually difficult to adopt the related-art detection method described above.

SUMMARY OF THE INVENTION

According to at least one embodiment of the present invention, there is provided a workpiece conveying system configured to convey a sheet-like workpiece to a downstream step, including: a workpiece conveyor configured to lift through attraction (adsorption, or adhesion) holding, by a workpiece holding unit, an uppermost workpiece of a stack stacking a plurality of workpieces, and to convey the uppermost workpiece of the stack to the downstream step one by one; and a conveyed workpiece number detector configured to detect a number of workpieces held by the workpiece holding unit at a detection timing, at which the workpiece held and raised by the workpiece holding unit in accordance with a normal workpiece conveying operation performed by the workpiece conveyor reaches an upper limit position of raising the workpiece, and at which a moving speed component of the workpiece in a raising direction is 0.

In the invention described above, at the detection timing, when the conveyed workpiece number detector detects that the number of workpieces held by the workpiece holding unit is one, the normal workpiece conveying operation is continued subsequently, and the workpiece is conveyed to a next step, and at the detection timing, when the conveyed workpiece number detector detects that the number of workpieces held by the workpiece holding unit is multiple, the multiple workpieces are discharged into a collection box without being conveyed to the next step.

Further, according to at least one embodiment of the present invention, there is provided a workpiece conveying system configured to convey a sheet-like workpiece to a downstream step, including: a workpiece conveyor configured to hold and lift, by a workpiece holding unit, an uppermost workpiece of a stack stacking a plurality of workpieces through attraction holding, and convey the uppermost workpiece of the stack to the downstream step one by one; and a conveyed workpiece posture detector configured to detect a posture of workpieces held by the workpiece holding unit at a detection timing at which the workpiece held and raised by the workpiece holding unit in accordance with a normal workpiece conveying operation performed by the workpiece conveyor reaches an upper limit position of raising the workpiece, at which a moving speed component of the workpiece in a raising direction is 0.

In the invention described above, at the detection timing, when the conveyed workpiece posture detector detects that a posture of the workpiece held by the workpiece holding unit is normal, the normal workpiece conveying operation is continued subsequently, and the workpiece is conveyed to a next step, and at the detection timing, when the conveyed workpiece posture detector detects that the posture of the workpiece held by the workpiece holding unit is abnormal, the workpiece is conveyed to the next step while correcting the posture of the workpiece to a normal posture.

Further, according to at least one embodiment of the present invention, there is provided a workpiece conveying system configured to convey a sheet-like workpiece to a downstream step, including: a workpiece conveyor configured to hold and lift, by a workpiece holding unit, an uppermost workpiece of a stack stacking a plurality of workpieces through attraction holding, and convey the uppermost workpiece of the stack to the downstream step one by one; a conveyed workpiece number detector configured to detect the number of workpieces held by the workpiece holding unit at a detection timing at which the workpiece held and raised by the workpiece holding unit in accordance with a normal workpiece conveying operation performed by the workpiece conveyor reaches an upper limit position of raising the workpiece, at which a moving speed component of the workpiece in a raising direction is 0; and a conveyed workpiece posture detector configured to detect a posture of the workpiece held by the workpiece holding unit at the detection timing at which the workpiece held and raised by the workpiece holding unit in accordance with the normal workpiece conveying operation performed by the workpiece conveyor reaches the upper limit position of raising the workpiece, at which the moving speed component of the workpiece in the raising direction is 0.

In the invention described above, at the detection timing, when the conveyed workpiece number detector detects that the number of workpieces held by the workpiece holding unit is one and the conveyed workpiece posture detector detects that the posture of the workpiece held by the workpiece holding unit is normal, the normal workpiece conveying operation is continued subsequently, and the workpiece is conveyed to a next step, at the detection timing, when the conveyed workpiece number detector detects that the number of workpieces held by the workpiece holding unit is one and the conveyed workpiece posture detector detects that the posture of the workpiece held by the workpiece holding unit is abnormal, the workpiece is conveyed to the next step while correcting the posture of the workpiece to a normal posture, and at the detection timing, when the conveyed workpiece number detector detects that the number of workpieces held by the workpiece holding unit is multiple, the multiple workpieces are discharged into a collection box without being conveyed to the next step.

In the inventions described above, the workpiece conveying system further includes a workpiece stopper configured to be brought into abutment against, at the upper limit position of raising the workpiece, an upper surface of the workpiece held and raised by the workpiece holding unit.

Further, according to at least one embodiment of the present invention, there is provided a conveyed workpiece number detector provided in a workpiece conveying system configured to hold and lift, by a workpiece holding unit, an uppermost workpiece of a stack stacking a plurality of workpieces through attraction holding, and convey the uppermost workpiece of the stack to a downstream step one by one, the conveyed workpiece number detector being configured to detect the number of workpieces held by the workpiece holding unit at a detection timing at which the workpiece held and raised by the workpiece holding unit in accordance with a normal workpiece conveying operation performed by the workpiece conveying system reaches an upper limit position of raising the workpiece, at which a moving speed component of the workpiece in a raising direction is 0.

Further, according to at least one embodiment of the present invention, there is provided a control method for a workpiece conveying system configured to hold and lift, by a workpiece holding unit, an uppermost workpiece of a stack stacking a plurality of workpieces through attraction holding, and convey the uppermost workpiece of the stack to a downstream step one by one, the control method including: detecting the number of workpieces held by the workpiece holding unit at a detection timing at which the workpiece held and raised by the workpiece holding unit in accordance with a normal workpiece conveying operation performed by the workpiece conveying system reaches an upper limit position of raising the workpiece, at which a moving speed component of the workpiece in a raising direction is 0; continuing, subsequently, the normal workpiece conveying operation to convey the workpiece to a next step when the detection result is that the number of workpieces held by the workpiece holding unit is one; and discharging a plurality of workpieces into a collection box without conveying the plurality of workpieces to the next step when the detection result is that the number of workpieces held by the workpiece holding unit is multiple.

Further, according to at least one embodiment of the present invention, there is provided a control method for a workpiece conveying system configured to hold and lift, by a workpiece holding unit, an uppermost workpiece of a stack stacking a plurality of workpieces through attraction holding, and convey the uppermost workpiece of the stack to a downstream step one by one, the control method including: detecting the number of workpieces and a posture of the workpiece held by the workpiece holding unit at a detection timing at which the workpiece held and raised by the workpiece holding unit in accordance with a normal workpiece conveying operation performed by the workpiece conveying system reaches an upper limit position of raising the workpiece, at which a moving speed component of the workpiece in a raising direction is 0; continuing, subsequently, the normal workpiece conveying operation to convey the workpiece to a next step when the detection result is that the number of workpieces held by the workpiece holding unit is one and the posture of the workpiece held by the workpiece holding unit is normal; conveying the workpiece to the next step while correcting the posture of the workpiece to a normal posture when the detection result is that the number of workpieces held by the workpiece holding unit is one and the posture of the workpiece held by the workpiece holding unit is abnormal; and discharging a plurality of workpieces into a collection box without conveying the plurality of workpieces to the next step when the detection result is that the number of workpieces held by the workpiece holding unit is multiple.

DESCRIPTION OF THE EMBODIMENTS

Now, a workpiece conveying system according to an embodiment of the present invention is described with reference to the attached drawings. Note that, the present invention is not limited to the example described below.

The present invention has been made in view of the above-mentioned circumstances, and has an object to provide a workpiece conveying system, which has a simple and low-cost configuration, and is capable of detecting taking of two (or double) workpieces and detecting a posture of a workpiece efficiently and accurately, thereby being capable of meeting a demand for high-speed conveyance of the workpiece. Further, the present invention has another object to provide a conveyed workpiece number detector to be used in the workpiece conveying system, and a control method for the workpiece conveying system.

Figure 1:
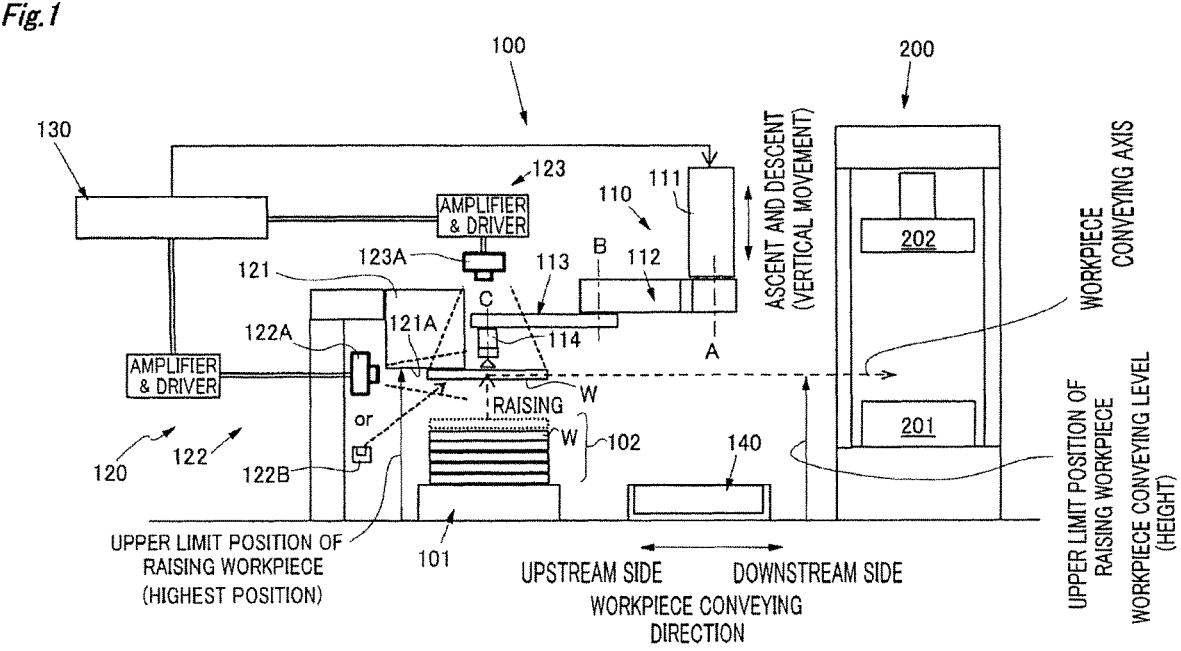
FIG. 1 is a configuration view for schematically illustrating an entire configuration of a workpiece conveying system according to one embodiment of the present invention (view seen from a horizontal direction orthogonal to a workpiece conveying direction).

A workpiece conveying system 100 according to an embodiment of the present invention is illustrated in FIG. 1. FIG. 1 is a configuration view for schematically illustrating an entire configuration of the workpiece conveying system 100 (view seen from a horizontal direction substantially orthogonal to a workpiece conveying direction).

As illustrated in FIG. 1, the workpiece conveying system 100 according to this embodiment is arranged in an upstream side (front-end step) of processing steps of a pressing machine 200, and is configured to take an uppermost workpiece W from a stack (bunch stacking a plurality of sheet-like (thin-plate-like) workpieces W) 102 placed on a stacker 101 so as to convey (feed) the workpieces W one by one to the pressing machine 200 in a next step (downstream step).

The uppermost workpiece W of the stack 102 is taken by a workpiece conveyor 110.

The workpiece conveyor 110 includes:

a vertically movable frame 111 configured to be movable in a vertical direction;

a first arm 112 having a proximal end portion supported on the vertically movable frame 111 so as to be freely swingable in a substantially horizontal plane via a first joint A;

a second arm 113 having a proximal end portion supported on a distal end portion of the first arm 112 so as to be freely swingable in the substantially horizontal plane via a second joint B; and a workpiece holding unit 114 supported on a distal end of the second arm 113 so as to be freely rotatable in the substantially horizontal plane via a third joint C, and configured to hold and release the workpiece W.

Here, the workpiece holding unit 114 includes a plurality of workpiece holding portions.

The workpiece conveyor 110 is controlled so as to convey the workpiece W in the following steps.

That is, first, under a state in which the vertically movable frame 111 is raised to a predetermined height, the first arm 112 and the second arm 113 are swung in the substantially horizontal plane about the first joint A and the second joint B, respectively, thereby moving the workpiece holding unit 114 to a position above the uppermost workpiece W of the stack 102.

After the workpiece holding unit 114 is moved to the predetermined position above the uppermost workpiece W of the stack 102, the vertically movable frame 111 is lowered, thereby bringing the workpiece holding unit 114 into contact with an upper surface of the uppermost workpiece W of the stack 102.

Under this state, the workpiece holding unit 114 holds the uppermost workpiece W of the stack 102 by a method such as vacuum suction (or magnetic attraction), and then the vertically movable frame 111 is raised. In this manner, the workpiece W held by the workpiece holding unit 114 is separated from the stack 102 and lifted upward.

After that, under a state in which the vertically movable frame 111 is raised to a predetermined height, the first arm 112 and the second arm 113 are swung in the substantially horizontal plane about the first joint A and the second joint B, respectively, thereby moving the workpiece holding unit 114 and the workpiece W to a position above a lower die 201 of the pressing machine 200.

From this state, after the vertically movable frame 111 is lowered to the predetermined position, the workpiece holding unit 114 cancels the vacuum suction to release the workpiece W so that the workpiece W is fed to the lower die 201. Thus, workpiece conveyance is finished. In the pressing machine 200, an upper die 202 configured to be vertically movable performs press forming on the workpiece W set on the lower die 201.

After that, through repetition of the steps described above, the workpiece conveyor 110 is controlled so as to lift and take one uppermost workpiece W of the stack 102 at a time, and then convey (feed) the workpiece W to the pressing machine 200 in the next step one by one.

As described above, through a direct conveyance of the workpiece W from the stack 102 to the pressing machine 200, increase in workpiece conveying speed can be achieved.

Here, the workpiece conveying system 100 according to this embodiment includes a conveyed workpiece state detector 120. Without reducing the workpiece conveying speed, the conveyed workpiece state detector 120 can detect so-called taking of two workpieces (or double workpieces) efficiently with high accuracy. The taking of two workpieces occurs when the workpiece conveyor 110 is intended to take the uppermost workpiece W from the stack 102.

In the following, the conveyed workpiece state detector 120 according to this embodiment is described.

The conveyed workpiece state detector 120 includes a workpiece stopper 121. At an upper limit position of raising the workpiece W (height position of finishing a workpiece raising operation), the workpiece stopper 121 is configured to come into abutment against (contact with) the upper surface of the workpiece W, which is raised while being held and lifted by the workpiece holding unit 114, at a workpiece contact portion 121A. Here, the workpiece contact portion 121A of the workpiece stopper 121 has such a planar positional relationship as to be sandwiched by at least two of the workpiece holding portions of the workpiece holding unit 114 when seen, for example, from an upper side of the workpiece W.

Further, the conveyed workpiece state detector 120 includes a two-workpiece (or double-workpieces) taking detector 122. The two-workpiece taking detector 122 is configured to detect (a thickness of) the workpiece W at a position at which a lower end (workpiece contact portion 121A) of the workpiece stopper 121 and the upper surface of the workpiece Ware brought into abutment against (contact with) each other. The two-workpiece taking detector 122 may be configured to detect the thickness of the workpiece W or taking of two workpieces through image analysis performed by a conveyance controller (control device) 130 based on data photographed by, for example, a camera 122A, or may be configured to detect the thickness of the workpiece W by the conveyance controller 130 based on data obtained through laser irradiation from a laser 122B.

The two-workpiece taking detector 122 corresponds to a conveyed workpiece number detector according to the present invention.

Further, the conveyed workpiece state detector 120 includes a conveyed workpiece posture detector 123. The conveyed workpiece posture detector 123 is configured to detect a posture of the workpiece W through image analysis performed by the conveyance controller 130 based on data photographed by, for example, a camera 123A.

The conveyed workpiece state detector 120 configured as described above detects the number of workpieces (taking of two workpieces) and/or the posture of the workpiece (for example, posture in a horizontal plane) through effective use of a timing at which the workpiece W raised while being held and lifted by the workpiece holding unit 114 in accordance with a normal workpiece conveying operation (control) reaches a position (highest position, upper limit position of raising the workpiece, or height position during conveyance of the workpiece in the horizontal direction) at which a moving speed component of the workpiece W in a raising direction is 0 (zero), for example, a timing at which the workpiece is switched so that, among workpiece conveying speed components, the moving speed component in the raising direction is zero and the workpiece has only a moving speed component in the horizontal direction.

Here, the above-mentioned timing corresponds to a detection timing according to the present invention.

At the timing at which the moving speed component of the workpiece W in the raising direction during conveyance is 0 (zero), movement of the workpiece W in the raising direction is stopped when the workpiece W is seen from a direction perpendicular to a thickness direction of the workpiece W (horizontal direction). Thus, in this state, for example, the thickness of the workpiece and taking of two workpieces can be detected with high accuracy. In addition, when this timing during the normal workpiece conveying operation is used, without reducing the workpiece conveying speed, the number of workpieces (taking of two workpieces) and/or the posture of the workpiece can be detected with high accuracy. The conveyed workpiece state detector 120 according to this embodiment uses this circumstance.

That is, unlike the related art, the conveyed workpiece state detector 120 according to this embodiment can detect, for example, the thickness of the workpiece, taking of two workpieces, and the posture quickly with high accuracy without providing a step involving reduction in workpiece conveying speed, such as a step of stopping conveyance of the workpiece in order to detect taking of two workpieces.

When the workpiece W is vibrated along with the conveying operation, the workpiece stopper 121 suppresses the vibration through abutment against the workpiece W, to thereby achieve operations and effects of increasing detection accuracy in detection of taking of two workpieces and detection of the posture of the workpiece, which are performed by the conveyed workpiece state detector 120. Therefore, when, for example, a workpiece involving no vibration is conveyed, the workpiece stopper 121 can be omitted. Further, when the workpiece W is made of a magnetic material, the workpiece stopper 121 includes a magnet as the workpiece contact portion 121A. When the workpiece W is made of a nonmagnetic material, the workpiece stopper 121 has a vacuum suction structure as the workpiece contact portion 121A. In those cases, even when the workpiece W has a large area, vibration generated when an operation of raising the workpiece W is stopped can be more reliably suppressed, thereby being capable of carrying out detection of the number of workpieces and detection of the posture of the workpiece quickly with high accuracy.

Figure 4:
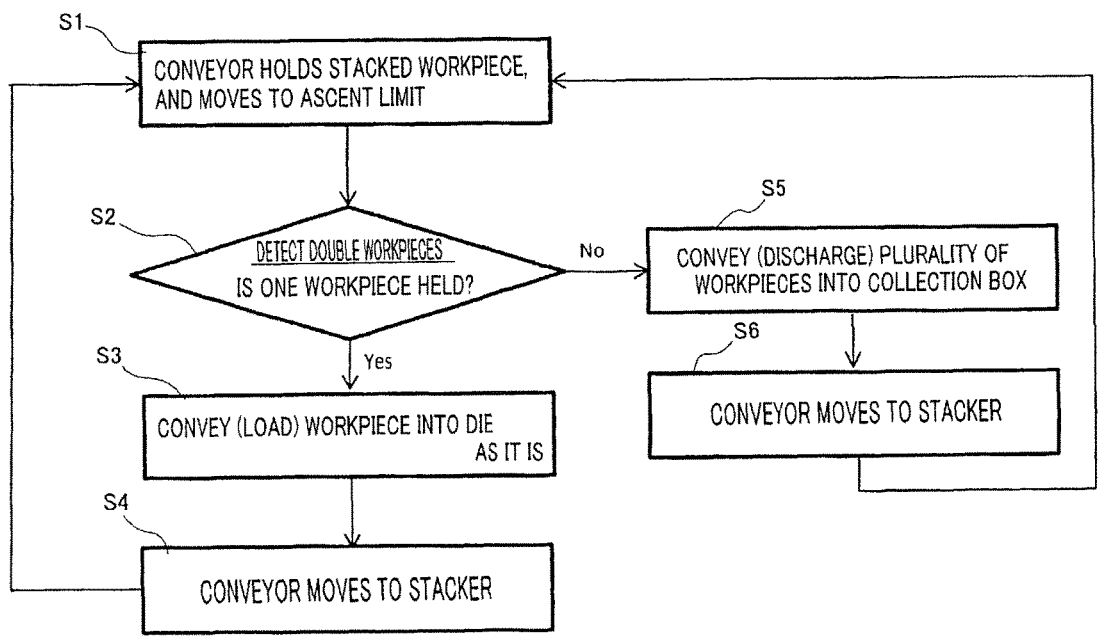
FIG. 4 is a flowchart for showing an example of control of workpiece conveyance performed by the workpiece conveying system according to the embodiment (case of detecting taking of two workpieces).

With reference to a flowchart of FIG. 4, description is made of a method (control method) of detecting the number of workpieces and conveying the workpiece, which is performed by the workpiece conveying system 100 including the conveyed workpiece state detector 120 (two-workpiece taking detector 122) according to this embodiment configured as described above.

Figure 2:
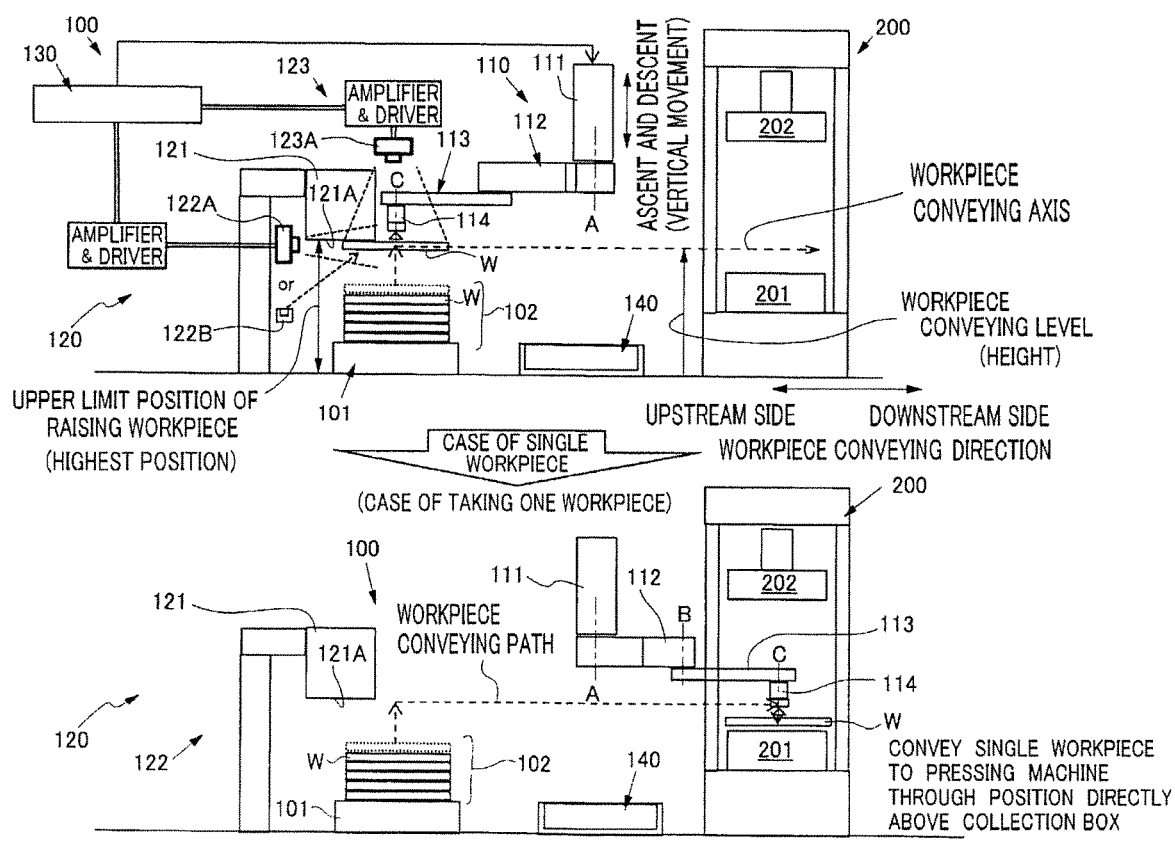
FIG. 2 is a view for illustrating a workpiece conveying operation performed by the workpiece conveying system according to the embodiment (normal example in which a single workpiece is taken).
Figure 3:
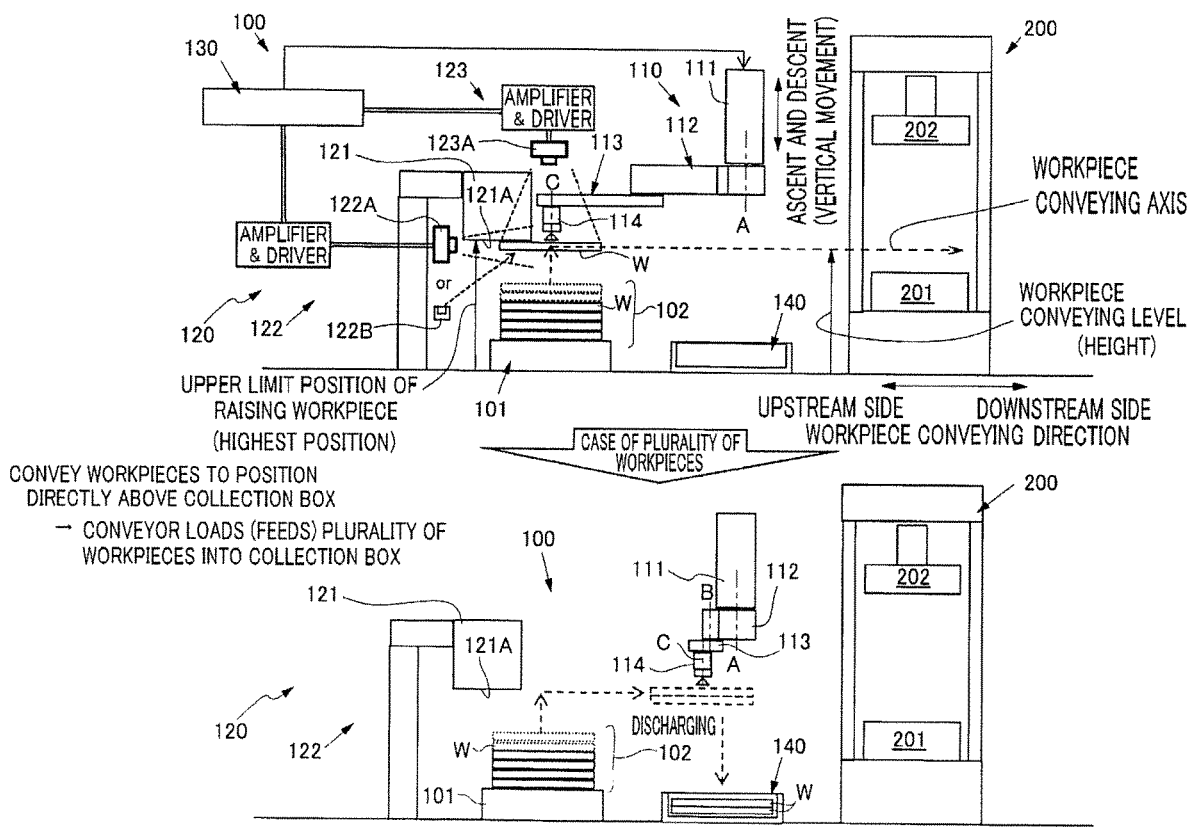
FIG. 3 is a view for illustrating the workpiece conveying operation performed by the workpiece conveying system according to the embodiment (abnormal example in which two workpieces are taken).

FIG. 4 is a flowchart for showing a case of detecting the number of workpieces (taking of two workpieces). Further, FIG. 2 and FIG. 3 are each a side view for illustrating an operation example of the workpiece conveying system 100 performed based on the flowchart of FIG. 4. The control is carried out by the conveyance controller 130.

In Step (represented as "S" in the drawings (the same holds true for the following description.)) 1, in accordance with the normal workpiece conveying operation (control), the workpiece conveyor 110 (conveyor) holds the uppermost workpiece W of the stack 102 and moves (ascends) to the upper limit position of raising the workpiece (hereinafter, also referred to as ascent limit).

In Step 2, at the timing at which the upper surface of the workpiece W is brought into abutment against (contact with) the workpiece contact portion 121A of the workpiece stopper 121, the two-workpiece taking detector 122 detects taking of two workpieces (double workpieces). Specifically, based on the data obtained from the camera 122A or the laser 122B, the two-workpiece taking detector 122 detects whether or not a single workpiece W is raised while being held and lifted by the workpiece holding unit 114 of the workpiece conveyor 110.

When the detection result is Yes (taking of one workpiece (single workpiece): normal), the operation proceeds to Step 3. When the detection result is No (taking of two workpieces: abnormal), the operation proceeds to Step 5.

When the operation proceeds to Step 3, the workpiece conveying system 100 operates as illustrated in FIG. 2. When the operation proceeds to Step 5, the workpiece conveying system 100 operates as illustrated in FIG. 3.

In Step 3, a single workpiece W is held by the workpiece holding unit 114, which is a normal state. Accordingly, the normal workpiece conveying operation (control) is continued subsequently, and the workpiece W is conveyed to the pressing machine 200 in the next step to convey (load or feed) the workpiece W to the lower die 201 (die).

Conveyance of the workpiece W is finished. Accordingly, in subsequent Step 4, the workpiece holding unit 114 of the workpiece conveyor 110 is moved from the pressing machine 200 to the stack 102 (stacker 101), and the operation returns to Step 1 in order to convey the subsequent workpiece W.

Meanwhile, in Step 5, two (or more) workpieces W are held by the workpiece holding unit 114, which is an abnormal state (what is called a state in which two workpieces are taken). Accordingly, the normal workpiece conveyance is not performed (is stopped), and the plurality of workpieces W held by the workpiece holding unit 114 are conveyed to a collection box 140 to release (discharge) the plurality of workpieces W into the collection box 140. Then, the operation proceeds to Step 6.

Herein, the phrase "taking of two workpieces" also encompasses an actual case in which two or more multiple workpieces W are lifted simultaneously.

In Step 6, the workpiece holding unit 114 of the workpiece conveyor 110 is moved from the collection box 140 to the stack 102 (stacker 101), and the operation returns to Step 1 in order to convey the subsequent workpiece W.

As described above, the workpiece conveying system 100 according to this embodiment includes the conveyed workpiece state detector 120, and the two-workpiece taking detector 122 detects taking of two workpieces at the timing at which an ascending speed component of the workpiece W is 0 (zero) while the workpiece conveyor 110 conveys the workpiece W in accordance with the normal workpiece conveying operation (control), specifically, the "timing at which the workpiece conveyor 110 holds the uppermost workpiece W of the stack 102 and moves (ascends) to the ascent limit, and the upper surface of the workpiece W is brought into abutment against (contact with) the workpiece contact portion 121A of the workpiece stopper 121". Accordingly, unlike the related art, it is not required to provide a dedicated step that is performed to detect taking of two workpieces and delays workpiece conveyance (step of stopping the workpiece during workpiece conveyance in order to detect taking of two workpieces). Thus, while meeting a demand for high-speed conveyance of the workpiece, whether or not two workpieces are taken can be detected with high accuracy.

That is, according to this embodiment, a workpiece conveying system, which has a simple and low-cost configuration, and is capable of detecting taking of two workpieces efficiently and accurately, thereby being capable of meeting a demand for high-speed conveyance of the workpiece can be provided. Further, a conveyed workpiece number detector that is suitable for the workpiece conveying system, and a control method for the workpiece conveying system can be provided.

According to this embodiment, while meeting a demand for high-speed conveyance of the workpiece, whether or not two workpieces are taken can be detected with high accuracy. Thus, there can be prevented various troubles caused when the workpiece is conveyed to, for example, the pressing machine in the next step under a state in which two workpieces are taken.

In particular, the conveyed workpiece state detector 120 (two-workpiece taking detector 122) according to this embodiment detects the number of workpieces (taking of two workpieces) through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, unlike the related art, during the conveying operation for the workpiece in the raising direction and the horizontal direction, the present invention does not involve switching (special change) of acceleration of workpiece conveyance, which caused, for example, when reduced conveying speed is increased to detect taking of two workpieces. Thus, an unnecessary inertial force, which is not required originally for conveyance, is not applied to the workpiece W supported by the workpiece holding unit 114. Accordingly, the present invention can contribute to achievement of high-speed conveyance of the workpiece while maintaining a simplified configuration, reduction in weight, and cost reduction of each of the workpiece holding unit 114 and the workpiece conveyor 110.

Further, the conveyed workpiece state detector 120 (two-workpiece taking detector 122) according to this embodiment detects the number of workpieces (taking of two workpieces) through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, the number of workpieces (taking of two workpieces) can be detected with high accuracy while suppressing increase in time period for workpiece conveyance, which is required to lift the uppermost workpiece W of the stack 102 and then convey the workpiece W into the next step. Accordingly, the present invention can contribute to achievement of high-speed conveyance of the workpiece.

Further, the conveyed workpiece state detector 120 (two-workpiece taking detector 122) according to this embodiment is configured to bring the workpiece W, which is being conveyed, into abutment against (contact with) the lower end (workpiece contact portion 121A) of the workpiece stopper 121 at the timing (timing of finishing the workpiece raising operation) of reaching the position (highest position or upper limit position of raising the workpiece) at which the moving speed component of the workpiece in the raising direction is 0, and is configured to bring the workpiece W into abutment against the lower end of the workpiece stopper 121 with use of movement of the workpiece along with conveyance of the workpiece W. Thus, it is not required to adopt such a complex configuration as to move the workpiece stopper 121 itself. Accordingly, the configuration is simplified, thereby being capable of suppressing increase in cost.

Figure 7:
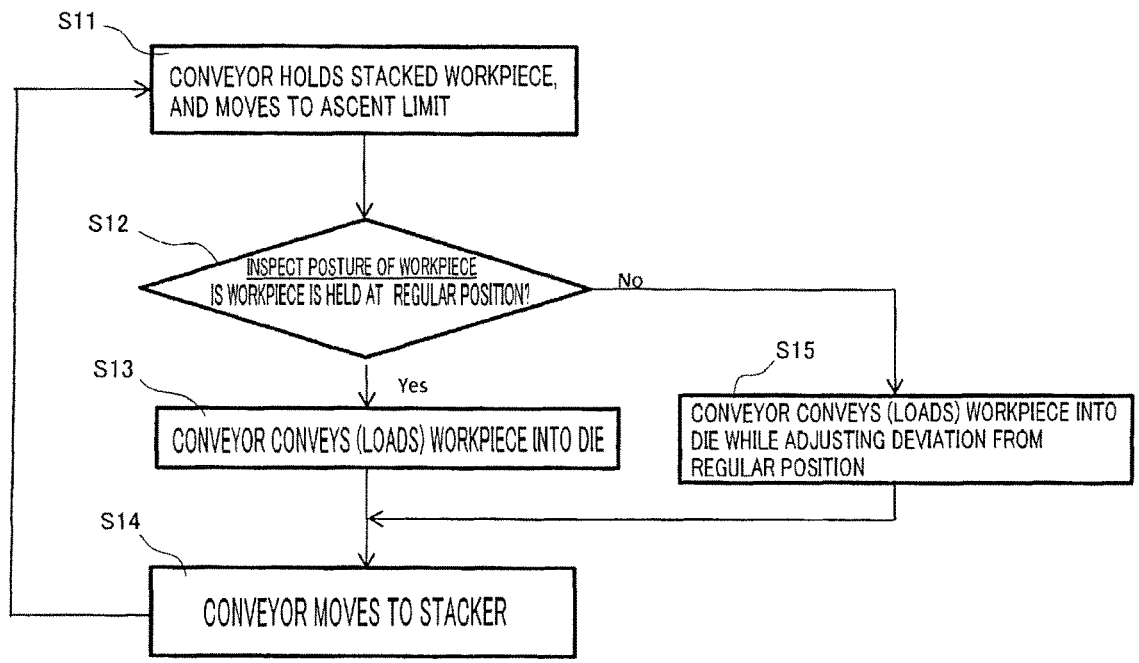
FIG. 7 is a flowchart for showing an example of control of workpiece conveyance performed by the workpiece conveying system according to the embodiment (case of detecting the posture of the workpiece).

Next, with reference to a flowchart of FIG. 7, description is made of a method (control method) of detecting the posture of workpiece and conveying the workpiece, which is performed by the workpiece conveying system 100 including the conveyed workpiece state detector 120 (conveyed workpiece posture detector 123) according to this embodiment. The control is carried out by the conveyance controller 130.

Figure 5:
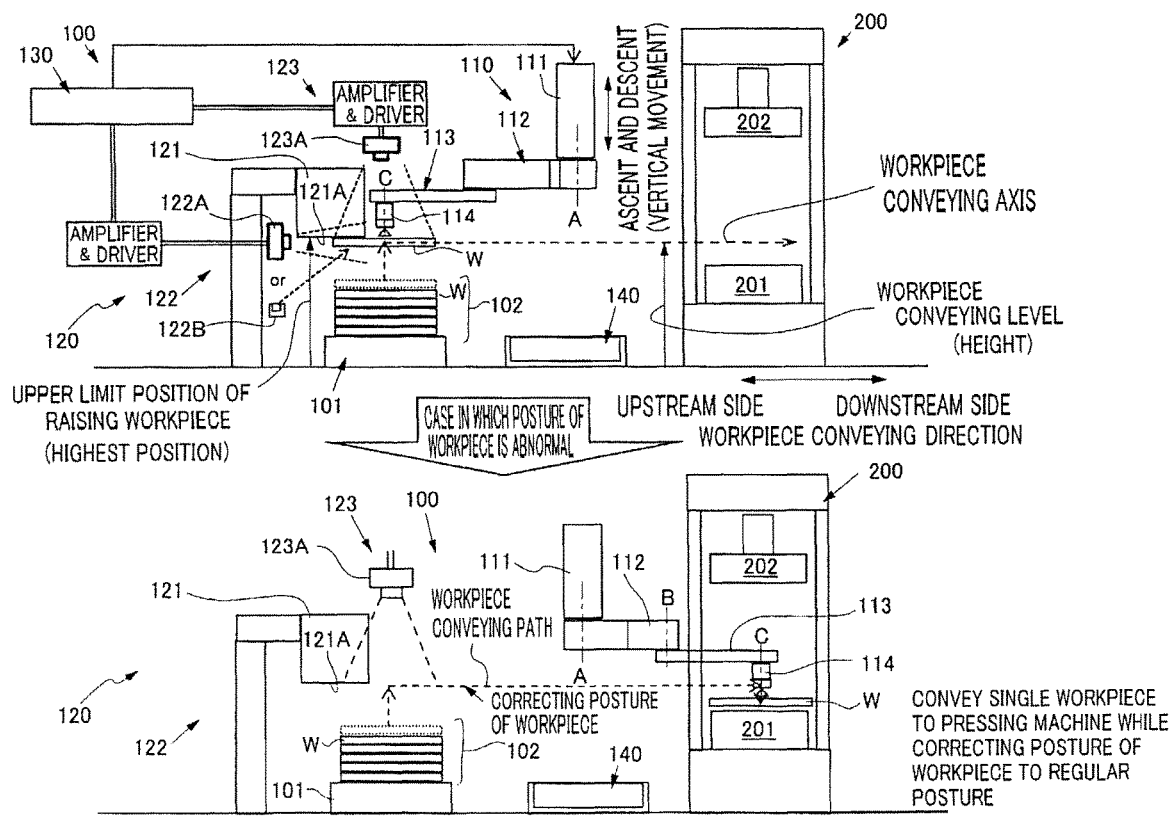
FIG. 5 is a view for illustrating the workpiece conveying operation performed by the workpiece conveying system according to the embodiment (example of a case of detecting a posture of the workpiece).
Figure 6:
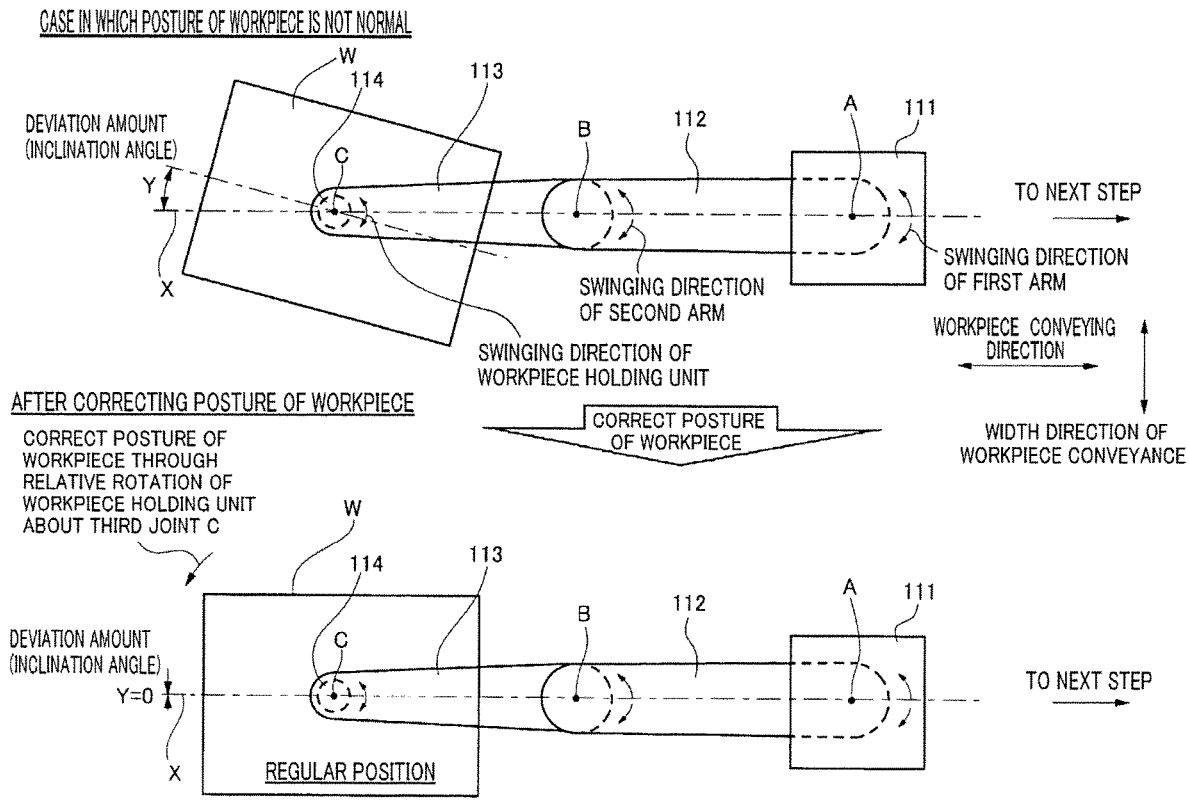
FIG. 6 is a plan view for illustrating correction of the posture of the workpiece in the workpiece conveying system according to the embodiment.

Further, FIG. 5 and FIG. 6 are each a view for illustrating an operation example of the workpiece conveying system 100 performed based on the flowchart of FIG. 7.

In Step 11, in accordance with the normal workpiece conveying operation control, the workpiece conveyor 110 (conveyor) holds the uppermost workpiece W of the stack 102 and moves (ascends) to the ascent limit.

In Step 12, at the timing at which the upper surface of the workpiece W is brought into abutment against (contact with) the workpiece contact portion 121A of the workpiece stopper 121, the conveyed workpiece posture detector 123 detects the posture of the workpiece W during conveyance. Specifically, through image analysis based on data photographed by, for example, the camera 123A, the conveyed workpiece posture detector 123 detects the posture of the workpiece W with respect to an axis X of the workpiece conveying direction in the horizontal plane (see FIG. 7), and detects whether or not the workpiece W held by the workpiece holding unit 114 is held at a regular position.

When the detection result is Yes (the posture is normal), the operation proceeds to Step 13. When the detection result is No (the posture is abnormal), the operation proceeds to Step 15.

In Step 13, the posture of the workpiece W held by the workpiece holding unit 114 is normal state. Accordingly, the normal workpiece conveying operation (control) is continued subsequently, and the workpiece W is conveyed to the pressing machine 200 in the next step to convey (load or feed) the workpiece W to the lower die 201 (die).

Conveyance of the workpiece W is finished. Accordingly, in subsequent Step 14, the workpiece holding unit 114 of the workpiece conveyor 110 is moved from the pressing machine 200 to the stack 102 (stacker 101), and the operation returns to Step 1 in order to convey the subsequent workpiece W.

Meanwhile, in Step 15, the posture of the workpiece W held by the workpiece holding unit 114 is abnormal (see FIG. 7). Accordingly, while correcting (adjusting) the posture of the workpiece to a normal state by changing a relative position of the workpiece holding unit 114 to the second arm 113 (relative rotation angle position about the third joint C) so as to set the posture of the workpiece W held by the workpiece holding unit 114 to a predetermined posture (set a deviation amount (inclination angle) Y from the regular position to 0) (see FIG. 6), the workpiece W is conveyed to the pressing machine 200 in the next step to convey (load or feed) the workpiece W to the lower die 201 (die). After that, the operation proceeds to Step 14, and then returns to Step 1 in order to convey the subsequent workpiece W.

As described above, the workpiece conveying system 100 according to this embodiment includes the conveyed workpiece state detector 120, and the conveyed workpiece posture detector 123 detects the posture of the workpiece at the timing at which the ascending speed component of the workpiece W is 0 (zero) while the workpiece conveyor 110 conveys the workpiece W in accordance with the normal workpiece conveying operation (control), specifically, the "timing at which the workpiece conveyor 110 holds the uppermost workpiece W of the stack 102 and moves (ascends) to the ascent limit, and the upper surface of the workpiece W is brought into abutment against (contact with) the workpiece contact portion 121A of the workpiece stopper 121". Accordingly, unlike the related art, it is not required to provide a dedicated step that is performed to detect the posture of the workpiece and delays workpiece conveyance (step of stopping the workpiece during workpiece conveyance in order to detect the posture of the workpiece). Thus, while meeting a demand for high-speed conveyance of the workpiece, the posture of the workpiece can be detected with high accuracy.

That is, according to this embodiment, a workpiece conveying system, which has a simple and low-cost configuration, and is capable of detecting a posture of a workpiece efficiently and accurately, thereby being capable of meeting a demand for high-speed conveyance of the workpiece can be provided.

According to this embodiment, while meeting a demand for high-speed conveyance of the workpiece, the posture of the workpiece can be detected with high accuracy. Thus, there can be prevented various troubles caused when the workpiece is conveyed to, for example, the pressing machine in the next step under a state in which the posture of the workpiece is not normal.

In particular, the conveyed workpiece state detector 120 (conveyed workpiece posture detector 123) according to this embodiment detects the posture of the workpiece through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, unlike the related art, during the conveying operation for the workpiece in the raising direction and the horizontal direction, the present invention does not involve switching (special change) of acceleration of workpiece conveyance, which caused, for example, when reduced conveying speed is increased to detect the posture of the workpiece. Thus, an unnecessary inertial force, which is not required originally for conveyance, is not applied to the workpiece W supported by the workpiece holding unit 114. Accordingly, the present invention can contribute to achievement of high-speed conveyance of the workpiece while achieving a simplified configuration, reduction in weight, and cost reduction of each of the workpiece holding unit 114 and the workpiece conveyor 110.

Further, the conveyed workpiece state detector 120 (conveyed workpiece posture detector 123) according to this embodiment detects the posture of the workpiece through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, the posture of the workpiece can be detected with high accuracy while suppressing increase in time period for workpiece conveyance, which is required to lift the uppermost workpiece W of the stack 102 and then convey the workpiece W into the next step. Accordingly, the present invention can contribute to achievement of high-speed conveyance of the workpiece.

Further, the conveyed workpiece state detector 120 (conveyed workpiece posture detector 123) according to this embodiment is configured to bring the workpiece W, which is being conveyed, into abutment against (contact with) the lower end (workpiece contact portion 121A) of the workpiece stopper 121 at the timing (timing of finishing the workpiece raising operation) of reaching the position (highest position or upper limit position of raising the workpiece) at which the moving speed component of the workpiece in the raising direction is 0, and is configured to bring the workpiece W into abutment against the lower end of the workpiece stopper 121 with use of movement of the workpiece along with conveyance of the workpiece W. Thus, it is not required to adopt such a complex configuration as to move the workpiece stopper 121 itself. Accordingly, the configuration is simplified, thereby being capable of suppressing increase in cost.

In the above description, the two-workpiece taking detector 122 and the conveyed workpiece posture detector 123 are described separately, but the conveyed workpiece state detector 120 may include both of the two-workpiece taking detector 122 and the conveyed workpiece posture detector 123.

In the following, with reference to a flowchart of FIG. 8, description is made of "detection of taking of two workpieces", "detection of the posture of the workpiece", and a control method for workpiece conveyance in a case in which the conveyed workpiece state detector 120 includes both of the two-workpiece taking detector 122 and the conveyed workpiece posture detector 123.

In Step 21, similarly to S1 of FIG. 4, in accordance with the normal workpiece conveying operation (control), the workpiece conveyor 110 (conveyor) holds the uppermost workpiece W of the stack 102 and moves (ascends) to the upper limit position of raising the workpiece.

In Step 22, similarly to S2 of FIG. 4, at the timing at which the upper surface of the workpiece W is brought into abutment against (contact with) the workpiece contact portion 121A of the workpiece stopper 121, the two-workpiece taking detector 122 detects taking of two workpieces (double workpieces).

When the detection result is Yes (taking of one workpiece: normal), the operation proceeds to Step 23. When the detection result is No (taking of two workpieces: abnormal), the operation proceeds to Step 26.

In Step 23, at the same timing as that in Step 22 above, similarly to S12 of FIG. 7, the conveyed workpiece posture detector 123 detects the posture of the workpiece W during conveyance.

When the detection result is Yes (the posture is normal), the operation proceeds to Step 24. When the detection result is No (the posture is abnormal), the operation proceeds to Step 28.

In Step 24, a single workpiece W is held by the workpiece holding unit 114, which is a normal state, and the posture of the workpiece is normal. Accordingly, the normal workpiece conveying operation (control) is continued subsequently, and the workpiece W is conveyed to the pressing machine 200 in the next step to convey (load or feed) the workpiece W to the lower die 201 (die).

Conveyance of the workpiece W is finished. Accordingly, in subsequent Step 25, the workpiece holding unit 114 of the workpiece conveyor 110 is moved from the pressing machine 200 to the stack 102 (stacker 101), and the operation returns to Step 1 in order to convey the subsequent workpiece W.

Meanwhile, in Step 26 to which the operation proceeds when the determination result is No in Step 22 (it is determined that two workpieces are taken), similarly to S5 of FIG. 4, two (or more) workpieces W are held by the workpiece holding unit 114, which is an abnormal state (what is called a state in which two workpieces are taken). Accordingly, the normal workpiece conveyance is not performed (is stopped), and the plurality of workpieces W held by the workpiece holding unit 114 are conveyed to the collection box 140 to release (discharge) the plurality of workpieces W into the collection box 140. Then, the operation proceeds to Step 27.

In Step 27, similarly to S6 of FIG. 4, the workpiece holding unit 114 of the workpiece conveyor 110 is moved from the collection box 140 to the stack 102 (stacker 101), and the operation returns to Step 1 in order to convey the subsequent workpiece W.

Further, in Step 28 to which the operation proceeds when the determination result is No in Step 23 (it is determined that the posture is abnormal), similarly to S15 of FIG. 7, the posture of the workpiece W held by the workpiece holding unit 114 is abnormal. Accordingly, while correcting (adjusting) the posture of the workpiece to a normal state by changing a relative position of the workpiece holding unit 114 to the second arm 113 (relative rotation angle position about the third joint C) so as to set the posture of the workpiece W held by the workpiece holding unit 114 to a predetermined posture (set the deviation (inclination angle) Y from the regular position to 0) (see FIG. 6), the workpiece W is conveyed to the pressing machine 200 in the next step to convey (load or feed) the workpiece W to the lower die 201. After that, the operation proceeds to Step 25, and then returns to Step 21 in order to convey the subsequent workpiece W.

Figure 8:
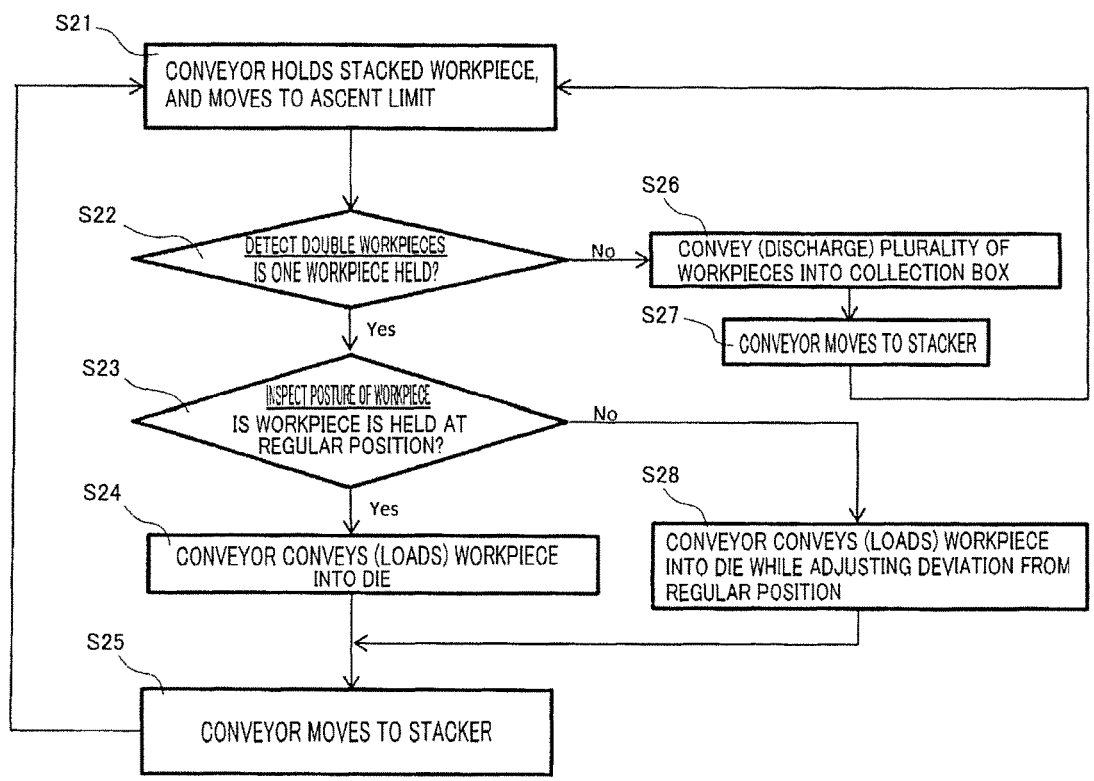
FIG. 8 is a flowchart for showing an example of control of workpiece conveyance performed by the workpiece conveying system according to the embodiment (case of detecting taking of two workpieces and detecting the posture of the workpiece).
Figure 9:
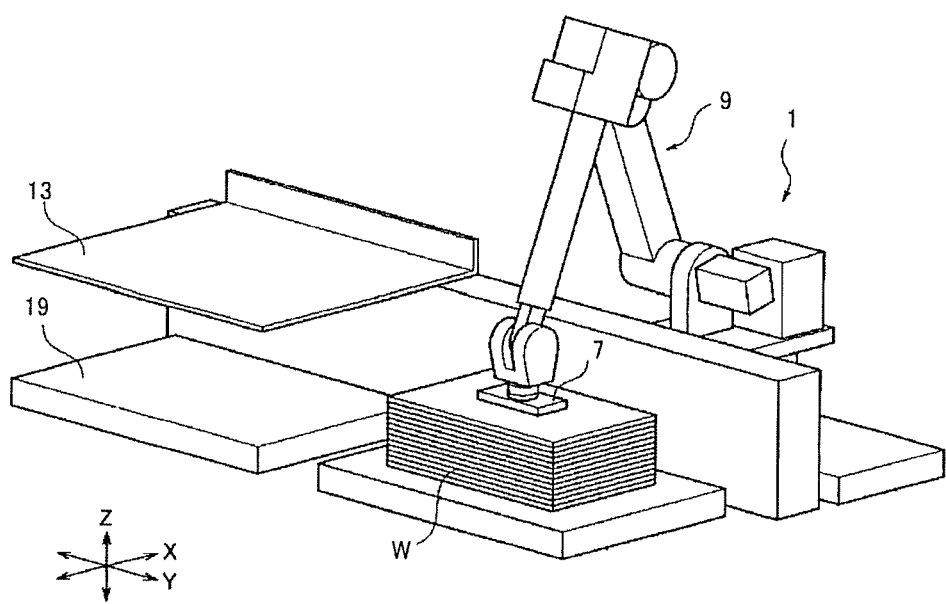
FIG. 9 is a perspective view for illustrating an example of a configuration of a related-art destack feeder.
Figure 10:
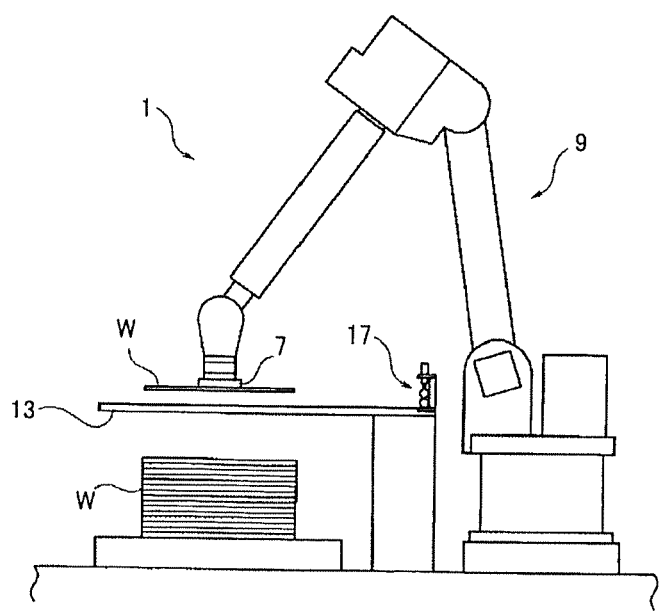
FIG. 10 is a side view for illustrating the example of the configuration of the related-art destack feeder.

In the flowchart of FIG. 8, a before-and-after relationship in terms of time is shown between detection (determination) of taking of two workpieces and detection (determination) of the posture of the workpiece. However, in actuality, the detection (determination) of taking of two workpieces and the detection (determination) of the posture of the workpiece have no such relationship, and can be performed substantially simultaneously.

That is, the flowchart of FIG. 8 does not show a flow of "performing detection (determination) of the posture of the workpiece after performing detection (determination) of taking of two workpieces". The flowchart of FIG. 8 shows that "when one workpiece is taken (two workpieces are not taken), a conveying mode differs depending on whether or not the posture of the workpiece is held at a regular position (predetermined position having a desired width)".

As described above, the workpiece conveying system 100 according to this embodiment includes the conveyed workpiece state detector 120, and the two-workpiece taking detector 122 detects taking of two workpieces and conveyed workpiece posture detector 123 detects the posture of the workpiece at the timing at which the ascending speed component of the workpiece W is 0 (zero) while the workpiece conveyor 110 conveys the workpiece W in accordance with the normal workpiece conveying operation (control), specifically, the "timing at which the workpiece conveyor 110 holds the uppermost workpiece W of the stack 102 and moves (ascends) to the ascent limit, and the upper surface of the workpiece W is brought into abutment against (contact with) the workpiece contact portion 121A of the workpiece stopper 121". Accordingly, unlike the related art, it is not required to provide a dedicated step that is performed to detect the posture of the workpiece and delays workpiece conveyance (step of stopping the workpiece during workpiece conveyance in order to detect the posture of the workpiece). Thus, while meeting a demand for high-speed conveyance of the workpiece, whether or not two workpieces are taken and the posture of the workpiece can be detected with high accuracy.

That is, according to this embodiment, a workpiece conveying system, which has a simple and low-cost configuration, and is capable of detecting taking of two workpieces and detecting a posture of a workpiece efficiently and accurately, thereby being capable of meeting a demand for high-speed conveyance of the workpiece can be provided.

According to this embodiment, while meeting a demand for high-speed conveyance of the workpiece, taking of two workpieces and the posture of the workpiece can be detected with high accuracy. Thus, there can be prevented various troubles caused when the workpiece is conveyed to, for example, the pressing machine in the next step under a state in which two workpieces are taken and/or the posture of the workpiece is not normal.

In particular, the conveyed workpiece state detector 120 (two-workpiece taking detector 122 and conveyed workpiece posture detector 123) according to this embodiment detects taking of two workpieces and the posture of the workpiece through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, unlike the related art, during the conveying operation for the workpiece in the raising direction and the horizontal direction, the present invention does not involve switching (special change) of acceleration of workpiece conveyance, which caused, for example, when reduced conveying speed is increased to detect the posture of the workpiece. Thus, an unnecessary inertial force, which is not required originally for conveyance, is not applied to the workpiece W supported by the workpiece holding unit 114. Accordingly, the present invention can contribute to achievement of high-speed conveyance of the workpiece while achieving a simplified configuration, reduction in weight, and cost reduction of each of the workpiece holding unit 114 and the workpiece conveyor 110.

Further, the conveyed workpiece state detector 120 (two-workpiece taking detector 122 and conveyed workpiece posture detector 123) according to this embodiment detects taking of two workpieces and the posture of the workpiece through effective use of the timing at which the workpiece W raised while being held and lifted by the workpiece holding unit 114 in accordance with the normal workpiece conveying operation (control) reaches the position (highest position or upper limit position of raising the workpiece) at which the moving speed component of the workpiece in the raising direction is 0, for example, the timing at which the workpiece is switched so that, among the workpiece conveying speed components, the moving speed component in the raising direction is 0 and the workpiece has only the moving speed component in the horizontal direction. Thus, the posture of the workpiece can be detected with high accuracy while suppressing increase in time period for workpiece conveyance, which is required to lift the uppermost workpiece W of the stack 102 and then convey the workpiece W into the next step. Accordingly, the present invention can contribute to achievement of high-speed conveyance of the workpiece.

Further, the conveyed workpiece state detector 120 (two-workpiece taking detector 122 and conveyed workpiece posture detector 123) according to this embodiment is configured to bring the workpiece W, which is being conveyed, into abutment against (contact with) the lower end (workpiece contact portion 121A) of the workpiece stopper 121 at the timing (timing of finishing the workpiece raising operation) of reaching the position (highest position or upper limit position of raising the workpiece) at which the moving speed component of the workpiece in the raising direction is 0, and is configured to bring the workpiece W into abutment against the lower end of the workpiece stopper 121 with use of movement of the workpiece along with conveyance of the workpiece W. Thus, it is not required to adopt such a complex configuration as to move the workpiece stopper 121 itself. Accordingly, the configuration is simplified, thereby being capable of suppressing increase in cost.

In this embodiment, description is made of the case in which the workpiece is taken from the stack stacking the plurality of sheet-like workpieces W and is fed to the pressing machine in the next step, but the workpiece conveying system according to the present invention is not limited to feeding of the workpiece to the pressing machine. As long as a sheet-like member is conveyed, the next step is not particularly limited. Further, in the present invention, a material for the workpiece is not limited to metal. Other materials such as paper, glass, a resin, and wood are also applicable as the material for the workpiece.

Further, description is made of the example in which the workpiece conveying system 100 according to this embodiment adopts the workpiece conveyor 110 including: the vertically movable frame 111 configured to be movable in the vertical direction; the first arm 112 configured to be freely swingable in the horizontal plane; the second arm 113 configured to be freely swingable in the horizontal plane; and the workpiece holding unit 114 configured to be freely rotatable in the horizontal plane, but the present invention is not limited thereto. For example, a workpiece conveyor using an articulated robot, as disclosed in Japanese Patent Application Laid-open No. 2014-172047, or another workpiece conveyor may be adopted.

Further, description is made of the case in which the conveyed workpiece state detector 120 according to this embodiment can detect, for example, the thickness of the workpiece and taking of two workpieces with high accuracy through detection at the timing (detection timing) at which the moving speed component of the workpiece W during conveyance in the raising direction is 0 (zero). However, this timing (detection timing) is not limited to the timing (detection timing) at which the moving speed component in the raising direction when the workpiece W is lifted vertically is 0 (zero). The present invention is also applicable to a timing (detection timing) at which the moving speed component in the raising direction is 0 (zero) in a case in which the workpiece W is raised while being moved in the horizontal direction (that is, a case in which the moving speed component in the horizontal direction and the moving speed component in the raising direction are composited).

According to the present invention, a workpiece conveying system, which has a simple and low-cost configuration, and is capable of detecting taking of two workpieces and detecting a posture of a workpiece efficiently and accurately, thereby being capable of meeting a demand for high-speed conveyance of the workpiece can be provided. Further, the present invention can provide a conveyed workpiece number detector that is suitable for the workpiece conveying system, and a control method for the workpiece conveying system.

The embodiment of the present invention described above is merely an example for describing the present invention, and various modifications may be made without departing from the gist of the present invention.

What is claimed is:

1. A workpiece conveying system configured to convey a sheet-like workpiece to a downstream step, comprising:
   a workpiece conveyor configured to lift through attraction holding, by a workpiece holding unit, an uppermost workpiece of a stack stacking a plurality of workpieces, and to convey the uppermost workpiece of the stack to the downstream step one by one;
   a conveyed workpiece number detector configured to detect a number of workpieces held by the workpiece holding unit at a detection timing, at which the workpiece held and raised by the workpiece holding unit in accordance with a normal workpiece conveying operation performed by the workpiece conveyor reaches an upper limit position of raising the workpiece, and at which a moving speed component of the workpiece in a raising direction is 0; and
   a workpiece stopper configured to be brought into abutment against, at the upper limit position of raising the workpiece, a top surface of the workpiece held and raised by the workpiece holding unit.

2. The workpiece conveying system according to claim 1, wherein at the detection timing, when the conveyed workpiece number detector detects that the number of workpieces held by the workpiece holding unit is one, the normal workpiece conveying operation is continued subsequently, and the workpiece is conveyed to a next step, and
   wherein at the detection timing, when the conveyed workpiece number detector detects that the number of workpieces held by the workpiece holding unit is multiple, the multiple workpieces are discharged into a collection box without being conveyed to the next step.

3. The workpiece conveying system according to claim 1, wherein the conveyed workpiece number detector is configured to detect the number of workpieces held by the work piece holding unit based on data obtained by a camera or laser.

4. A workpiece conveying system configured to convey a sheet-like workpiece to a downstream step, comprising:
   a workpiece conveyor configured to lift through attraction holding, by a workpiece holding unit, an uppermost workpiece of a stack stacking a plurality of workpieces, and to convey the uppermost workpiece of the stack to the downstream step one by one;
   a conveyed workpiece posture detector configured to detect a posture of workpiece held by the workpiece holding unit at a detection timing, at which the workpiece held and raised by the workpiece holding unit in accordance with a normal workpiece conveying operation performed by the workpiece conveyor reaches an upper limit position of raising the workpiece, and at which a moving speed component of the workpiece in a raising direction is 0; and
   a workpiece stopper configured to be brought into abutment against, at the upper limit position of raising the workpiece, a top surface of the workpiece held and raised by the workpiece holding unit.

5. The workpiece conveying system according to claim 4, wherein at the detection timing, when the conveyed workpiece posture detector detects that the posture of the workpiece held by the workpiece holding unit is normal, the normal workpiece conveying operation is continued subsequently, and the workpiece is conveyed to a next step, and
   wherein at the detection timing, when the conveyed workpiece posture detector detects that the posture of the workpiece held by the workpiece holding unit is abnormal, the workpiece is conveyed to the next step while correcting the posture of the workpiece to a normal posture.

6. The workpiece conveying system according to claim 4, further comprising a conveyed workpiece number detector configured to detect the number of workpieces held by the work piece holding unit based on data obtained by a camera or laser.

7. A workpiece conveying system configured to convey a sheet-like workpiece to a downstream step, comprising:
   a workpiece conveyor configured to lift through attraction holding, by a workpiece holding unit, an uppermost workpiece of a stack stacking a plurality of workpieces, and to convey the uppermost workpiece of the stack to the downstream step one by one;
   a conveyed workpiece number detector configured to detect a number of workpieces held by the workpiece holding unit at a detection timing, at which the workpiece held and raised by the workpiece holding unit in accordance with a normal workpiece conveying operation performed by the workpiece conveyor reaches an upper limit position of raising the workpiece, and at which a moving speed component of the workpiece in a raising direction is 0;
   a conveyed workpiece posture detector configured to detect a posture of the workpiece held by the workpiece holding unit at the detection timing, at which the workpiece held and raised by the workpiece holding unit in accordance with the normal workpiece conveying operation performed by the workpiece conveyor reaches the upper limit position of raising the workpiece, and at which the moving speed component of the workpiece in the raising direction is 0; and
   a workpiece stopper configured to be brought into abutment against, at the upper limit position of raising the workpiece, a top surface of the workpiece held and raised by the workpiece holding unit.

8. The workpiece conveying system according to claim 7, wherein at the detection timing, when the conveyed workpiece number detector detects that the number of workpieces held by the workpiece holding unit is one, and the conveyed workpiece posture detector detects that the posture of the workpiece held by the workpiece holding unit is normal, the normal workpiece conveying operation is continued subsequently, and the workpiece is conveyed to a next step, wherein at the detection timing, when the conveyed workpiece number detector detects that the number of workpieces held by the workpiece holding unit is one, and the conveyed workpiece posture detector detects that the posture of the workpiece held by the workpiece holding unit is abnormal, the workpiece is conveyed to the next step while correcting the posture of the workpiece to a normal posture, and wherein at the detection timing, when the conveyed workpiece number detector detects that the number of workpieces held by the workpiece holding unit is multiple, the multiple workpieces are discharged into a collection box without being conveyed to the next step.

9. The workpiece conveying system according to claim 7, wherein the conveyed workpiece number detector is configured to detect the number of workpieces held by the work piece holding unit based on data obtained by a camera or laser.

10. A conveyed workpiece number detector, which is provided in a workpiece conveying system configured to lift through attraction holding, by a workpiece holding unit, an uppermost workpiece of a stack stacking a plurality of workpieces, and to convey the uppermost workpiece of the stack to a downstream step one by one, the conveyed workpiece number detector comprising:

a detector configured to detect the number of workpieces held by the workpiece holding unit at a detection timing, at which the workpiece held and raised by the workpiece holding unit in accordance with a normal workpiece conveying operation performed by the workpiece conveying system reaches an upper limit position of raising the workpiece, and at which a moving speed component of the workpiece in a raising direction is 0, and a workpiece stopper configured to be brought into abutment against, at the upper limit position of raising the workpiece, a top surface of the workpiece held and raised by the workpiece holding unit.

11. The workpiece conveying system according to claim 10, wherein the conveyed workpiece number detector is configured to detect the number of workpieces held by the work piece holding unit based on data obtained by a camera or laser.

12. A control method for a workpiece conveying system configured to lift through attraction holding, by a workpiece holding unit, an uppermost workpiece of a stack stacking a plurality of workpieces, and to convey the uppermost workpiece of the stack to a downstream step one by one, the control method comprising:

detecting the number of workpieces held by the workpiece holding unit at a detection timing, at which the workpiece held and raised by the workpiece holding unit in accordance with a normal workpiece conveying operation performed by the workpiece conveying system reaches an upper limit position of raising the workpiece, and at which a moving speed component of the workpiece in a raising direction is 0;

continuing, subsequently, the normal workpiece conveying operation to convey the workpiece to a next step when the detection result is that the number of workpieces held by the workpiece holding unit is one;

discharging a plurality of workpieces into a collection box without conveying the plurality of workpieces to the next step when the detection result is that the number of workpieces held by the workpiece holding unit is multiple; and bringing a workpiece stopper into abutment against, at the upper limit position of raising the workpiece, a top surface of the workpiece held and raised by the workpiece holding unit.

13. A control method for a workpiece conveying system configured to lift through attraction holding, by a workpiece holding unit, an uppermost workpiece of a stack stacking a plurality of workpieces, and to convey the uppermost workpiece of the stack to a downstream step one by one, the control method comprising:

detecting the number of workpieces and a posture of the workpiece held by the workpiece holding unit at a detection timing, at which the workpiece held and raised by the workpiece holding unit in accordance with a normal workpiece conveying operation performed by the workpiece conveying system reaches an upper limit position of raising the workpiece, and at which a moving speed component of the workpiece in a raising direction is 0;

continuing, subsequently, the normal workpiece conveying operation to convey the workpiece to a next step when the detection result is that the number of workpieces held by the workpiece holding unit is one, and the posture of the workpiece held by the workpiece holding unit is normal;

conveying the workpiece to the next step while correcting the posture of the workpiece to a normal posture when the detection result is that the number of workpieces held by the workpiece holding unit is one and the posture of the workpiece held by the workpiece holding unit is abnormal;

discharging a plurality of workpieces into a collection box without conveying the plurality of workpieces to the next step when the detection result is that the number of workpieces held by the workpiece holding unit is multiple; and bringing a workpiece stopper into abutment against, at the upper limit position of raising the workpiece, a top surface of the workpiece held and raised by the workpiece holding unit.

\* \* \* \* \*